(12) United States Patent
Seren et al.

(10) Patent No.: US 7,996,118 B2
(45) Date of Patent: Aug. 9, 2011

(54) METHOD AND DEVICE FOR CARRYING OUT AT LEAST ONE FLIGHT TESTING ON AN AIRCRAFT AND THE USE THEREOF

(75) Inventors: Cédric Seren, Toulouse (FR); François Bommier, Pibrac (FR); Laurent Verdier, Montpitol (FR)

(73) Assignee: Airbus France, Toulouse (FR)

( * ) Notice: Subject to any disclaimer, the term of this patent is extended or adjusted under 35 U.S.C. 154(b) by 632 days.

(21) Appl. No.: 12/067,778

(22) PCT Filed: Sep. 21, 2006

(86) PCT No.: PCT/FR2006/002158
§ 371 (c)(1),
(2), (4) Date: Mar. 21, 2008

(87) PCT Pub. No.: WO2007/034079
PCT Pub. Date: Mar. 29, 2007

(65) Prior Publication Data
US 2008/0249670 A1    Oct. 9, 2008

(30) Foreign Application Priority Data

Sep. 22, 2005   (FR) ..................................... 05 09662

(51) Int. Cl.
*G05D 1/00* (2006.01)
(52) U.S. Cl. ................... 701/3; 701/4; 701/15; 244/190
(58) Field of Classification Search ............... 701/3, 7, 701/15, 16, 4, 11, 14, 5; 244/200.1, 183, 244/175, 190, 197, 223; 318/356, 611
See application file for complete search history.

(56) References Cited

U.S. PATENT DOCUMENTS

| 6,216,063 | B1 | 4/2001 | Lind | |
|---|---|---|---|---|
| 6,292,720 | B1 | 9/2001 | Schulz | |
| 6,553,333 | B1* | 4/2003 | Shenk | 702/182 |
| 7,236,914 | B1* | 6/2007 | Zyskowski | 703/8 |
| 7,801,714 | B2* | 9/2010 | Villey | 703/8 |
| 2001/0032039 | A1 | 10/2001 | Burson | |
| 2004/0111190 | A1 | 6/2004 | Van De Kreeke | |

(Continued)

FOREIGN PATENT DOCUMENTS

EP          0 999 484         5/2000

(Continued)

OTHER PUBLICATIONS

International Search Report dated Jan. 4, 2007 w/ English translation.

(Continued)

*Primary Examiner* — Thomas G Black
*Assistant Examiner* — Marthe Marc Coleman
(74) *Attorney, Agent, or Firm* — Dickinson Wright PLLC

(57) ABSTRACT

An aircraft device includes a rudder, a control unit that applies a deflection instruction to the rudder, a measuring section that measures a recovery characteristic of aircraft movement in response to the rudder deflection instruction, a recorder that records an applied deflection instruction and a corresponding recovery characteristic, and a servo-control that maintains the recovery characteristic. The control unit receives a recovery instruction for a recovery characteristic, which is identifiable for an aerodynamic effect, and generates the rudder deflection instruction induced by the recovery instruction.

9 Claims, 1 Drawing Sheet

U.S. PATENT DOCUMENTS

| | | |
|---|---|---|
| 2004/0267478 A1 | 12/2004 | Goodman |
| 2005/0096801 A1 | 5/2005 | Luo |
| 2005/0125182 A1 | 6/2005 | Mao |

FOREIGN PATENT DOCUMENTS

| | | |
|---|---|---|
| EP | 1 139 190 | 10/2001 |
| EP | 1 396 421 | 3/2004 |
| EP | 1 538 785 | 6/2005 |

OTHER PUBLICATIONS

Written Opinion of the ISA w/ English translation.
Patent Abstracts of Japan vol. 1995, No. 7, Aug. 31, 1995 & JP 07 096896A, Apr. 11, 1995.

* cited by examiner

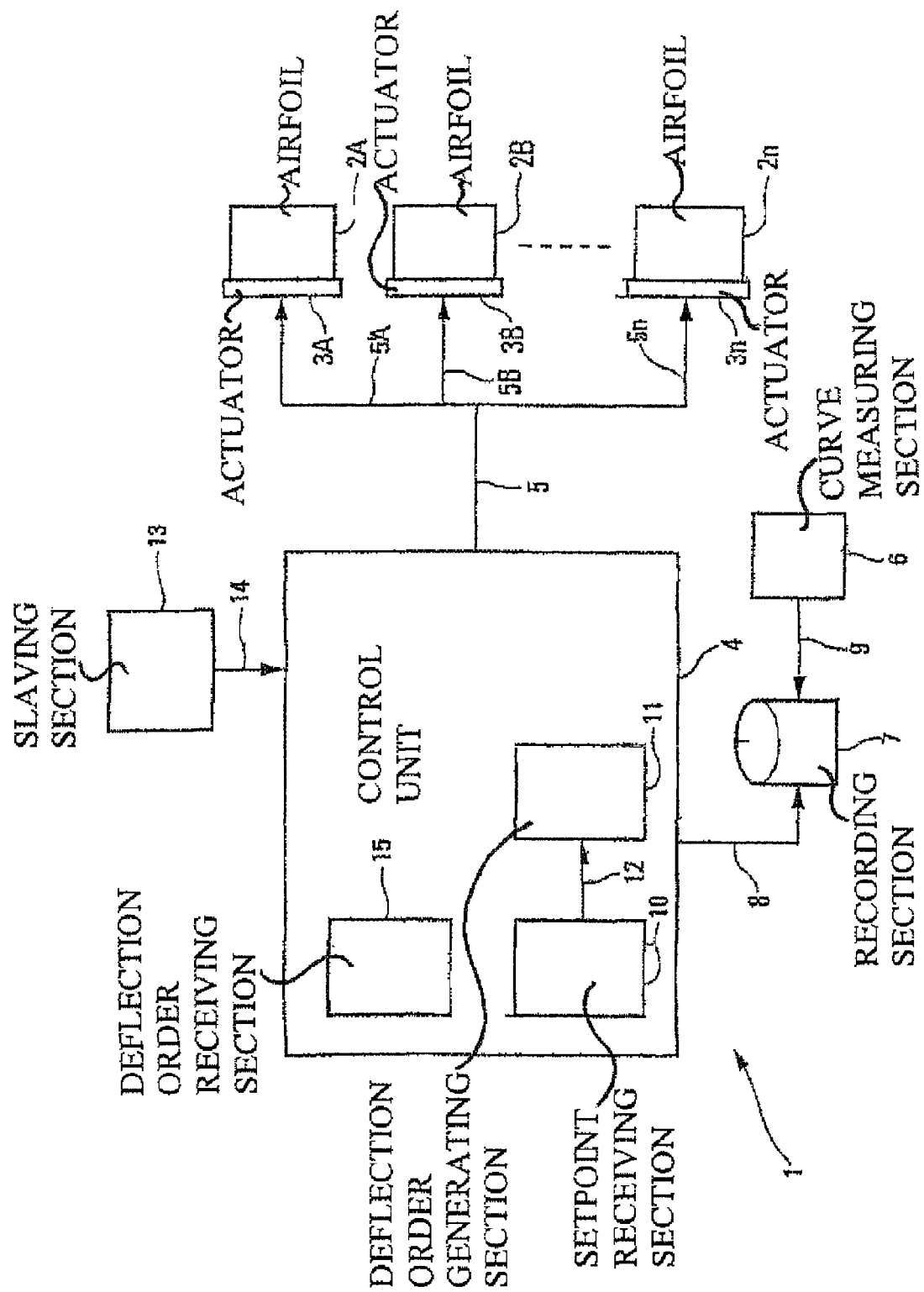

METHOD AND DEVICE FOR CARRYING OUT AT LEAST ONE FLIGHT TESTING ON AN AIRCRAFT AND THE USE THEREOF

FIELD OF THE INVENTION

The present invention relates to a method and a device for carrying out at least one in-flight trial on an aircraft, a method for carrying out a protocol of a plurality of trials, as well as a procedure for identifying aerodynamic phenomena on an aircraft using such a method.

BACKGROUND OF THE RELATED ART

The field of application of the invention relates to the identification of an aircraft's flight mechanics, that is to say the comparison of the actual movements of an aircraft with their modeling as well as, if appropriate, the adjustment of parameters of the model used to achieve optimal fidelity of this model.

Hence, a trials protocol is implemented which indicates, generally, a way to carry out in-flight trials for a determined purpose. To this end, a series of predefined sequences of airfoil deflections is defined in a standard manner. In the case of flight mechanics, the protocols consist, in a standard manner, of in-flight trials solely carried out in open loop on the aircraft, that is to say no aircraft attitude control system is engaged in the course of these trials. In the particular case where the aircraft is naturally unstable, a control system which is limited to a minimum stabilizer is simply envisaged. The protocols are carried out in the form of trials campaigns. In the course of these trials, predefined control sequences are applied to the aircraft. The controls applied, as well as the resulting outputs, are measured on the aircraft and are recorded. They are processed a posteriori. The actual controls measured on the aircraft in the course of the in-flight trials are rerun on a simulation model. The actual outputs measured on the aircraft are thereafter compared with the outputs from the simulation model. A registration of certain effects can then be performed. The quality (accuracy, etc.) of the identification (of the flight mechanics) depends on the quality (accuracy, etc.) of each of the aforesaid steps. It will be noted that the present invention pertains essentially to improving the first step, namely the trials protocol.

As indicated previously, the fundamental characteristic of a standard trials protocol resides in the fact that it is composed of in-flight trials carried out entirely in open loop, the attitude control systems of the aircraft being deactivated. The input orders during each trial are dispatched directly to the airfoils in an automatic manner, independently of the movements of the aircraft. These airfoil orders are all defined in gated form and make it possible to excite the aircraft.

It will be noted that a trials protocol specifies the airfoils which will be called upon in flight during the trials, the deflection level to which these airfoils will be subjected, the duration of deflection, as well as the flight point at which the trials will be carried out.

However, with such a standard trials protocol, and although the controls applied are different at each trial, the output curves all exhibit similar dynamics. A more thorough analysis makes it possible to demonstrate that the response of the aircraft complies with a dominant mode which prevents it being possible to distinguish the other phenomena from the flight mechanics of the aircraft. This dominant mode occurs on all the outputs. Thus, all the aerodynamic effects are correlated. This dominant mode hampers the observability of all the effects. More precisely, this dominant mode corresponds to a combination of aerodynamic effects and prevents the possibility of being able to accurately separate the various effects and of being able to characterize them individually. Consequently, the input calls to the aircraft, during such a standard trials protocol, are poor for identifying all the aerodynamic phenomena of the aircraft.

SUMMARY OF THE INVENTION

The aim of the present invention is to generate an overall improvement in the observability of the various flight mechanics phenomena, to obtain better quality of the aforesaid registration and/or a reduction in the duration of the in-flight trials which are used for the identification of a model of the flight mechanics.

It will be noted that it has become necessary to increase the observability of certain effects so as to improve the standard procedures for identifying aerodynamic phenomena. Furthermore, reducing the cycle of trials campaigns makes it possible to limit the costs incurred. This latter objective can be dealt with at the experimental protocols level by reducing the duration of the in-flight trials. Consequently, the present invention seeks in particular to identify the flight mechanics phenomena in a more accurate manner, on the basis of a protocol comprising a reduced number trials.

Hence, the present invention relates, firstly, to a method for carrying out at least one in-flight trial on an aircraft, in particular a transport airplane.

According to the invention, said method according to which:

a) at least one deflection order to be applied to at least one airfoil of the aircraft is generated;
b) said deflection order is applied, during a flight of said aircraft, to said airfoil which is capable of being deflected so as to act on at least one piloting axis of the aircraft and which comprises at least one actuator for deflecting said airfoil as a function of at least one deflection order, said deflection order illustrating an evolution of the deflection as a function of time;
c) at least one output curve is measured, illustrating the evolution as a function of time of a movement of the aircraft in response to the application of said deflection order to the airfoil during the flight; and
d) the deflection order applied to the airfoil, and the measured corresponding output curve are recorded, is noteworthy in that:
  in step a):
  at least one output setpoint is received, making it possible to obtain at least one output curve which is identifying for at least one aerodynamic effect of the aircraft; and
  at least one airfoil deflection order which is induced by said output setpoint received is generated; and
  the aircraft is slaved in flight so as to obtain and maintain on said aircraft said identifying output curve, during the application of said deflection order induced by said output setpoint.

Thus, by virtue of the invention, the input (of the trial) is modified to obtain at least one airfoil deflection order which is capable of isolating at least one particular aerodynamic effect, with respect to others, in the temporal response or responses gathered as output from the in-flight trial. This is obtained by taking into account an output setpoint which illustrates an output curve making it possible to render at least one aerodynamic effect more identifiable, that is to say making it possible to individually isolate said aerodynamic effect so as to be able to deduce therefrom its characteristics. Thus, the output no longer evolves according to a dominant mode as stated above, but according to a controlled evolution.

In a preferred embodiment, in step a), at least one airfoil deflection order is also received, which is applied as is to said airfoil.

Thus, during the trials, at least one standard deflection order, which directly controls the airfoil, and at least one deflection order induced by an output setpoint, which controls the output, are taken into account.

Advantageously, to generate the deflection order representative of the output setpoint and to carry out the slaving, means which are formed on the basis of a so-called modal control theory, specified below, are used.

Additionally, in an advantageous manner, to carry out a trial, said steps a) to d) and said slaving are implemented for a plurality of different airfoils of the aircraft.

The present invention also relates to a device for carrying out at least one trial on an aircraft, in particular an airplane.

According to the invention, said device of the type comprising:
- at least one airfoil of the aircraft, capable of being deflected so as to act on at least one piloting axis of the aircraft during a flight and comprising at least one actuator for deflecting said airfoil as a function of at least one deflection order received, which illustrates an evolution of the deflection as a function of time;
- a control unit for transmitting to said actuator at least one deflection order to be applied to said airfoil;
- means for measuring at least one output curve illustrating the evolution as a function of time of a movement of the aircraft, in response to the application in flight of a deflection order to the airfoil; and
- means for recording at least one deflection order applied to the airfoil and the measured corresponding output curve, is noteworthy in that:
said control unit comprises:
- at least one first means capable of receiving at least one output setpoint making it possible to obtain at least one output curve which is identifying for at least one aerodynamic effect of the aircraft; and
- at least one second means for generating at least one airfoil deflection order which is induced by said output setpoint transmitted by said first means; and said device comprises, moreover, at least one slaving means for slaving the aircraft so as to obtain and maintain on said aircraft said identifying output curve, when the corresponding deflection order generated by said second means is applied to the airfoil.

Thus, by virtue of said slaving means, the device in accordance with the invention makes it possible to carry out a closed-loop trial.

In a preferred embodiment, said control unit comprises, moreover, a third means for receiving at least one airfoil deflection order which is transmitted as is to the actuator of the airfoil.

Furthermore, advantageously, said airfoil corresponds to one of the following elements of the aircraft:
- a spoiler;
- an aileron;
- a tailplane;
- an elevator; and
- a fin.

The present invention also relates to a method for carrying out a protocol of $\underline{n}$ trials on an aircraft.

According to the invention, this method is noteworthy in that:
- in a preliminary step (prior to the trial flight), $\underline{m}$ airfoil deflection orders that must be applied directly to the aircraft and $\underline{p}$ output setpoints that make it possible to isolate at least one aerodynamic effect of the aircraft in the latter's temporal response, which is illustrated by at least one output curve, are determined, $\underline{m}$ and $\underline{p}$ being integers such that m+p=n;
- $\underline{n}$ trials are carried out, in the course at least of a subsequent (trial) flight of the aircraft, by applying respectively said $\underline{m}$ deflection orders and said $\underline{p}$ output setpoints, the latter also being applied in the form of representative deflection orders, said $\underline{n}$ trials being carried out at least partially by implementing the aforesaid method in accordance with the invention or by using the aforesaid device in accordance with the invention; and
- for each of said $\underline{n}$ trials, the deflection order applied is recorded, and $\underline{q}$ corresponding output curves are measured and recorded, $\underline{q}$ being an integer.

Additionally, the present invention also relates to a procedure for identifying aerodynamic phenomena on an aircraft, with the aid of a flight simulator, namely a procedure according to which:

A/ at least one protocol of n in-flight trials is carried out, n being an integer, making it possible to obtain a plurality of n actual input curves representing deflection orders actually applied to the aircraft and a plurality of associated actual output curves;

B/ said $\underline{n}$ actual input curves are applied to said flight simulator;

C/ the corresponding output curves obtained in response to the application of said $\underline{n}$ actual input curves are measured on said flight simulator;

D/ said actual output curves and said corresponding output curves emitted by said flight simulator are compared pairwise; and E/ a simulation model used by said flight simulator is refined on the basis of this comparison.

According to the invention, this identification procedure is noteworthy in that in step A/, the aforesaid method in accordance with the invention, which is intended to carry out a protocol of $\underline{n}$ in-flight trials on an aircraft, is implemented.

BRIEF DESCRIPTION OF THE DRAWING

The single figure of the appended drawing will elucidate the manner in which the invention may be carried out. This single figure is the schematic diagram of a device in accordance with the invention.

DETAILED DESCRIPTION OF THE INVENTION

The device 1 in accordance with the invention and schematically represented in the figure, is intended to carry out at least one in-flight trial on an aircraft (not represented), in particular a transport airplane.

Hence, said device 1 comprises:
- at least one standard airfoil 2A, 2B, . . . 2n of the aircraft, which is capable of being deflected in flight so as to act on at least one piloting axis (yaw, roll, pitch) of the aircraft. This airfoil 2A, 2B, . . . 2n comprises at least one standard actuator 3A, 3B, . . . 3n, for deflecting said airfoil 2A, 2B, . . . 2n as a function of at least one deflection order received. A deflection order is defined, within the framework of the present invention, by a curve representing an evolution of the amplitude of the deflection as a function of time;

a control unit 4 which is connected by way of at least one link 5A, 5B, . . . 5n (forming part of a general link 5) to said actuator 3A, 3B, . . . 3n and which is formed so as to transmit to said actuator 3A, 3B, . . . 3n at least one deflection order to be applied to said airfoil 2A, 2B, . . . 2n;

standard means 6, for measuring at least one output curve. Within the framework of the present invention, an output curve illustrates the evolution as a function of time of a movement (sideslip, yaw, roll, list, heading, load factor, etc.) of the aircraft, in response to the application in flight of a deflection order to the airfoil 2A, 2B, . . . 2n; and means 7 which are connected by way of links 8 and 9 respectively to the control unit 4 and to the means 6 and which are intended to record on a standard recording medium (not specifically represented), at least:

a deflection order which is actually applied to the airfoil 2A, 2B, . . . 2n (by way of the control unit 4 and of the actuator 3A, 3B, . . . 3n); and the corresponding output curve which is measured by the means 6.

Moreover, according to the invention:

said control unit 4 comprises:

at least one means 10 capable of receiving at least one output setpoint making it possible to obtain at least one output curve which is identifying for at least one aerodynamic effect (sideslip, yaw, roll, list, heading, load factor, etc.) of the aircraft. This means 10 can for example be an input means, such as a keyboard for example, which allows an operator, in particular a test pilot, to instigate a prerecorded sequence of said output setpoint in said control unit 4; and at least one means 11 which is connected by way of a link 12 to said means 10, which is embodied in the form of a precontrol P, and which is formed so as to generate at least one airfoil deflection order representative of an output setpoint received from said means 10. Said airfoil deflection order is intended to be transmitted to the actuator 3A, 3B, . . . 3n; and said device 1 comprises moreover, at least one slaving means 13 which is connected by way of a link 14 to said control unit 4, which comprises a corrector K, and which is formed so as to slave the aircraft so as to obtain and maintain on said aircraft an identifying output curve, when the deflection order corresponding to this output curve, which is generated by the means 11, is applied to the airfoil 2A, 2B, . . . 2n. Said slaving means 13 can be integrated, at least partially, within said control unit 4.

In a particular embodiment, the sensor of the slaving means and the measurement means 6 can be the same.

Thus, by virtue of the invention, the input (of the trial), is modified so as to obtain at least one airfoil deflection order which is capable of isolating at least one particular aerodynamic effect, with respect to others, in the temporal responses gathered as output from the in-flight trial. This is obtained by taking into account an output setpoint which illustrates an output curve making it possible to render at least one aerodynamic effect more identifiable. Thus, the output no longer evolves according to a dominant mode, but according to a controlled evolution.

Within the framework of the present invention, an output curve is considered to be identifying if it makes it possible to identify (that is to say to define or characterize) a particular aerodynamic effect of the aircraft, with the aid of the values measured and recorded by the means 7 during the application to the aircraft of a deflection order which is representative of this output curve. Furthermore, it is considered that an effect is completely identifiable if, on the basis of the reference time plots arising from one or more trials of a trials protocol, it is possible to register all the simulation curves on this set of reference plots by simply varying the coefficient associated in the model with this aerodynamic effect. This identifiability property can be generalized to several aerodynamic effects.

Said control unit 4 comprises, moreover, a means 15 for receiving at least one direct airfoil deflection order, which is thereafter transmitted as is to the actuator 3A, 3B, . . . 3n of the airfoil 2A, 2B, . . . 2n, without being modified. Hence, said means 15 can be an input means similar or identical to said means 10.

In a particular embodiment, said corrector K (which makes it possible to carry out the closed-loop trials) and said precontrol P are formed on the basis of a so-called standard modal control theory. This theory illustrates a control law synthesis technique. The mathematical calculations which make it possible to numerically determine the corrector K and the precontrol P rely on a modification of the natural dynamics of the aircraft, when the latter is slaved by the corrector K and driven by the precontrol P. The corrector K and the precontrol P form a controller.

The device 1 in accordance with the invention can be formed so as to control a single airfoil or to simultaneously control a plurality of airfoils during a trial. By way of illustration, an airfoil 2A, 2B, . . . 2n to be controlled can correspond to one of the following elements of the aircraft:

a spoiler;

an aileron;

a tailplane;

an elevator; and a fin.

Preferably, the device 1 in accordance with the invention is intended to carry out, not a single trial, but a protocol of $\underline{n}$ trials on the aircraft.

To carry out such a protocol of n trials, according to the invention, the following steps are implemented:

in a preliminary step, $\underline{m}$ airfoil deflection orders that must be applied directly $\overline{\text{to}}$ the aircraft and $\underline{p}$ output setpoints that make it possible to isolate at least $\overline{\text{one}}$ aerodynamic effect of the aircraft in the latter's temporal response, which is illustrated by at least one output curve, are determined. The integers $\underline{m}$ and $\underline{p}$ are such that m+p=n;

$\underline{n}$ trials are carried out, in the $\overline{\text{course}}$ $\overline{\text{at}}$ least of a subsequent flight of the aircraft, with the aid of the device 1 in accordance with the invention, by applying respectively said m deflection orders (received by the means 15) and said $\overline{p}$ output setpoints (received by the means 10), the latter being applied in the form of representative deflection orders determined by the means 11; and for each of said n in-flight trials of said trials protocol:

the deflection order applied is recorded with the aid of the means 7 of said device 1; and $\underline{q}$ associated output curves, that are also recorded with the aid of said means 7, are measured with the aid of the means 6 of said device 1, q being an integer.

Thus, by virtue of the device 1 in accordance with the invention, one is no longer restricted to sending only standard airfoil orders to the actuators 3A, 3B, . . . 3n of the airfoils. Certain outputs of the aircraft are driven and slaved to output setpoints, (defined in the course of said preliminary step). These output setpoints are formed so as to be potentially identifying.

Experience shows that, by virtue of the invention, the following advantages in particular are obtained:
- the direct command of certain states appearing as output generates real movements on all the airfoils at one and the same time (multiairfoil approach);
- the actual output curves (that is to say those actually obtained at output) are very close to the output curves representative of the output setpoints; and
- direct optimization is obtained on at least one output curve, thereby making it possible to obtain good identification of at least one aerodynamic effect.

Hence, the device 1 in accordance with the present invention therefore carries out the following operations:
- slaving one or more outputs to (setpoint) orders appearing as identifiers. The slaving is ensured by the corrector K. Its role is to maintain the aircraft on the corresponding output curve or curves; and
- directly controlling the aircraft, no longer by airfoil deflection orders as in the standard protocols, but by orders representative of output setpoints which therefore pertain directly to the outputs. Thus, the inputs of the trials protocol in accordance with the invention are of two types: standard airfoil deflections pertaining to the airfoils 2A, 2B, . . . 2n of the aircraft, and output setpoint orders. This direct control by output curve is ensured by the precontrol P which transforms the desired output setpoints into deflection orders for the airfoils 2A, 2B, . . . 2n. Thus, a distinction is created between the standard airfoil inputs on the one hand and the controlled outputs on the other hand.

A preferred application of the device 1 in accordance with the invention relates to its use in a procedure for identifying aerodynamic phenomena on an aircraft. This procedure exhibits in particular the following steps A/ to E/:
A/ carrying out with the aid of said device 1 at least one protocol of n in-flight trials, n being an integer, making it possible to obtain a plurality of n actual input curves representing deflection orders actually applied to the aircraft and a plurality of associated actual output curves;
B/ applying said n actual input curves to a flight simulator;
C/ measuring on the flight simulator the corresponding output curves, obtained in response to the application of said n actual input curves;
D/ comparing, pairwise, said actual output curves and said corresponding output curves emitted by the flight simulator; and
E/ refining a simulation model used by said flight simulator, on the basis of this or these comparisons.

The invention claimed is:

1. A method for carrying out at least one in-flight trial on an aircraft, according to which method:
   a) at least one deflection order to be applied to at least one airfoil of the aircraft is generated;
   b) said deflection order is applied, during a flight of said aircraft, to said airfoil which is capable of being deflected so as to act on at least one piloting axis of the aircraft and which comprises at least one actuator for deflecting said airfoil as a function of at least one deflection order, said deflection order illustrating an evolution of the deflection as a function of time;
   c) at least one output curve is measured, illustrating the evolution as a function of time of a movement of the aircraft in response to the application of said deflection order to the airfoil during the flight; and
   d) the deflection order applied to the airfoil, and the measured corresponding output curve are recorded, wherein:

in step a):
   at least one output setpoint is received, making it possible to obtain at least one output curve which is identifying for at least one aerodynamic effect of the aircraft; and
   at least one airfoil deflection order which is induced by said output setpoint received is generated; and
   the aircraft is slaved in flight so as to obtain and maintain on said aircraft said identifying output curve, during the application of said deflection order induced by said output setpoint.

2. The method as claimed in claim 1, wherein in step a), at least one airfoil deflection order is also received, which is applied as is to said airfoil.

3. The method as claimed in claim 1, wherein, to generate the deflection order induced by the output setpoint and to carry out the slaving, means which are formed on the basis of a so-called modal control theory are used.

4. The method as claimed in claim 1, wherein, to carry out a trial, said steps a) to d) and said slaving are implemented for a plurality of airfoils of the aircraft.

5. A device for carrying out at least one trial on an aircraft, said device comprising:
   at least one airfoil of the aircraft, capable of being deflected so as to act on at least one piloting axis of the aircraft during a flight and comprising at least one actuator for deflecting said airfoil as a function of at least one deflection order received, which illustrates an evolution of the deflection as a function of time;
   a control unit for transmitting to said actuator at least one deflection order to be applied to said airfoil;
   a measuring section that measures at least one output curve illustrating the evolution as a function of time of a movement of the aircraft, in response to the application in flight of a deflection order to the airfoil; and
   a recorder that records at least one deflection order applied to the airfoil and the measured corresponding output curve, wherein:
   said control unit comprises:
      a receiving section that receives at least one output setpoint making it possible to obtain at least one output curve which is identifying for at least one aerodynamic effect of the aircraft; and
      a generating section that generates at least one airfoil deflection order which is induced by said output setpoint transmitted by said receiving section; and
   said device comprises, moreover, at least one slaving section that slaves the aircraft so as to obtain and maintain on said aircraft said identifying output curve, when the corresponding deflection order generated by said generating section is applied to the airfoil.

6. The device as claimed in claim 5, wherein said control unit comprises, moreover, a deflection order receiving section that receives at least one airfoil deflection order which is transmitted as is to the actuator of the airfoil.

7. The device as claimed in claim 5, wherein said airfoil corresponds to one of the following elements of the aircraft:
   a spoiler;
   an aileron;
   a tailplane;
   an elevator; and
   a fin.

8. A method for carrying out a protocol of n in-flight trials on an aircraft, n being an integer greater than 1, wherein:
   in a preliminary step, m airfoil deflection orders that must be applied directly to the aircraft and poutput setpoints that make it possible to isolate at least one aerodynamic effect of the aircraft in the latter's temporal response, which is illustrated by at least one output curve, are determined, m and ρ being integers such that m+ρ=n;

n trials are carried out, in the course at least of a subsequent flight of the aircraft, by applying respectively said m deflection orders and said ρ output setpoints, the latter also being applied in the form of representative deflection orders, said n trials being carried out at least partially by implementing the method specified under claim 1; and for each of said n trials, the deflection order applied is recorded, and g corresponding output curves are measured and recorded, a being an integer.

9. A procedure for identifying aerodynamic phenomena on an aircraft, with the aid of a flight simulator, according to which procedure:

A/ at least one protocol of n in-flight trials is carried out, n being an integer, making it possible to obtain a plurality of n actual input curves representing deflection orders actually applied to the aircraft and a plurality of associated actual output curves;

B/ said n actual input curves are applied to said flight simulator;

C/ the corresponding output curves obtained in response to the application of said n actual input curves are measured on said flight simulator;

D/ said actual output curves and said corresponding output curves emitted by said flight simulator are compared pairwise; and E/ a simulation model used by said flight simulator is refined on the basis of this comparison, wherein in step A/, the method specified under claim 8 is implemented.

* * * * *